Patented Mar. 26, 1940

2,194,827

UNITED STATES PATENT OFFICE 2,194,827

IMPREGNATING MATERIAL FOR PRESERVING WOOD

Aaron Gordon, Berkeley, Calif.

No Drawing. Application June 29, 1936, Serial No. 87,939

6 Claims. (Cl. 134—78.6)

The present invention relates broadly to the protection of wood in its raw and finished state against wood attacking organisms, such as marine borer, termite and various other insects and fungi, and more particularly to an improved impregnating material which can be conveniently and effectively applied to lumber, such as fence posts, railroad ties, pilings, telephone poles, etc., to protect them against destructive agencies and at the same time render them resistant to fire.

An object of the invention is to provide practical and effective impregnating chemicals for wood which will deposit therein material toxic to wood destroying organisms and fungi.

Another object of the invention is to provide impregnating chemicals for the preservation of wood which are effectively distributed throughout the fibrous structure thereof and combined and/or precipitated therein to render the wood immune to attack by living organisms and more resistant to fire than when in its natural state.

While it is recognized that the market offers a large number of wood preservatives in which heavy metal salts are employed in one form or another to provide a toxic for wood destroying organisms and to render the wood fire retardant, these preservatives are subject to leaching when exposed to natural conditions. It is therefore a further object of the present invention to provide an impregnating material employing heavy metal salts for the preservation of wood in which the salts are rendered non-leachable and consequently more permanent in their action than are the prior art wood preserving materials.

In its broadest aspect, the present invention may be said to reside in the provision of a substance or the excess of a reagent which will react with the products of hydrolysis in the event of leaching, and thus shift the chemical equilibrium back to the insoluble metal salt or salts employed as the basic agency. In other words, the present invention employs the common mass law principle and provides a preservative which is substantially non-leachable and consequently more permanent in the wood than are the comparable wood preservatives now on the market.

The impregnating material contemplated by this invention may consist essentially of aqueous ammonia and any metallic salts soluble therein. As examples of these the following may be cited:

1. Copper sulphate ($CuSO_4$) or any other copper salt and ammonium phosphate (($NH_4$)$_3PO_4$) or any other phosphate in aqueous ammonia ($NH_4OH$).
2. Zinc sulphate ($ZnSO_4$) or any other zinc salt and ammonium phosphate (($NH_4$)$_3PO_4$) or any other phosphate in aqueous ammonia ($NH_4OH$).
3. Copper sulphate ($CuSO_4$) or any other copper salt and sodium carbonate ($Na_2CO_3$) in aqueous ammonia ($NH_4OH$).
4. Zinc sulphate ($ZnSO_4$) or any other zinc salt and sodium carbonate ($Na_2CO_3$) in aqueous ammonia ($NH_4OH$).
5. Zinc sulphate ($ZnSO_4$) or any other zinc salt and borax ($Na_2B_4O_7$) or any other boron salt in aqueous ammonia ($NH_4OH$).
6. Copper sulphate ($CuSO_4$) or any other copper salt and borax ($Na_2B_4O_7$) or any other boron salt in aqueous ammonia ($NH_4OH$).

In addition to the above specific examples, it will be understood that other combinations of the above may be used, and that nickel (Ni) and/or cobalt (Co) salts may be substituted for the above salts without departing from the spirit and scope of this invention.

It has been found that when the above named salts or any combination thereof are dissolved in aqueous ammonia ($NH_4OH$) and injected into the wood and the ammonia is permitted to evaporate, they precipitate and form a number of insoluble salts in the wood. In this manner the wood is rendered immune to all wood destroying organisms, and at the same time it is also rendered fire resistant and improved in both tensile and compressive strength.

When the wood is impregnated with the above copper and zinc salt combinations, the following chemical combinations will be formed in the wood:

1. $CuNH_4PO_4$
2. $ZnNH_4PO_4$
3. $CuCO_3 \cdot Cu(OH)_2$
4. $ZnCO_3 \cdot Zn(OH)_2$
5. $ZnB_4O_7$
6. $CuB_4O_7$ The $CuNH_4PO_4$ and the $ZnNH_4PO_4$ combinations set forth above will be found particularly effective, due to the fact that they form salts which are insoluble in water and toxic to wood attacking organisms, and at the same time the $NH_4PO_4$ radicals will render the wood fire resistant. The selection of the basic $CuCO_3$ and $ZnCO_3$ is because these are soluble in the acidic solution of the digestive juices in the wood attacking organisms and thus liberate the toxic copper and zinc salts. At the same time the $CO_3$ radical renders the wood fire retardant, due to the formation of $CO_2$ in the presence of heat.

In connection with the zinc borate ($ZnB_4O_7$) and the copper borate ($CuB_4O_7$) combinations set forth above, it should be pointed out that these salts, while slightly soluble, are toxic to wood destroying organisms, and at the same time the borate radical ($B_4O_7$) will also render the wood fire retardent.

By the addition of an excess of $Cu(OH)_2$ and/or $Zn(OH)_2$, the metal salts injected in the wood are rendered more permanent, as the excess $Cu(OH)_2$ and/or $Zn(OH)_2$ and/or any other slightly soluble base will prevent hydrolysis of the precipitated salts. Thus should the $CuNH_4PO_4$ undergo hydrolysis and liberate a soluble phosphate, this will be reprecipitated by the base and be again rendered insoluble in water.

By way of an example in connection with the use of a basic zinc carbonate, it is pointed out that when the zinc carbonate impregnated in the wood dissolves it will slowly form both zinc and carbonate ions, and these ions will hydrolyze and produce a soluble carbonic acid which will leach out. However, by the provision of an excess of zinc hydroxide or other slightly soluble base, as suggested above, the latter will react with the soluble carbonic acid formed in the hydrolysis and thus reprecipitate the zinc carbonate. In other words, the zinc carbonate is never lost, because the soluble part thereof is changed back, due to the presence of the excess of zinc hydroxide or other base.

As the base I have used $Cu(OH)_2$ and/or $Zn(OH)_2$. These dissolved in ammonia give the complex bases $Cu(NH_3)_4(OH)_2$ and $$Zn(NH_3)_4(OH)_2$$

respectively. When the ammonia evaporates off, these complex bases go back to the form $Cu(OH)_2$ or $Zn(OH)_2$, or to the oxides $CuO$ or $ZnO$.

The copper complex hydroxide has a dissolving action on cellulose which causes the preservative to penetrate the wood more easily and completely. Therefore by its use two important advantages are obtained. One advantage is that the penetration of the wood by the preserving solution is accelerated, and the other is that leaching of the preservative from the wood is prevented.

As an example, a solution compounded in accordance with this invention that embodies the desirable characteristics referred to above and which has been found to be effective and reliable may be prepared as follows:

|  | Per cent |
|---|---|
| Basic copper carbonate ($CuCO_3$—$Cu(OH)_2$) | 10 |
| Basic zinc carbonate ($ZnCO_3$—$Zn(OH)_2$) | 10 |
| Copper ammonium phosphate ($CuNH_4PO_4$) | 30 |
| Zinc ammonium phosphate ($ZnNH_4PO_4$) | 30 |
| Zinc borate ($ZnB_4O_7$) | 10 |
| Copper borate ($CuB_4O_7$) | 10 |

The above are dissolved in a 10% solution of aqueous ammonia.

In the above solution the ammonium hydroxide serves to form the complex ions of the copper and zinc salts and subsequently, when the wood is impregnated with the above solution, the ammonia evaporates and the various metal salts and their hydroxides, as given above, are precipitated and/or deposited in the wood. Under these conditions the hydroxides render the salts unleachable, due to the reprecipitation of the soluble products liberated in the process of the hydrolysis. At the same time the basic copper ammonium complex ($Cu(NH_3)_4(OH)_2$), due to its solvent action on the cellulose of the wood, causes the wood to be more thoroughly impregnated.

By way of further explanation it should be added that while the above identified metal salts are insoluble and form a good preservative, and can be used without their hydroxide, the addition of the hydroxide of the particular salts renders them more lasting and effective, due to the chemical actions described above.

In the application of my invention to the impregnation of finished lumber, particularly where it may be used without paint, the metal salts, suggested above, may be chosen so as to avoid discoloration of the wood upon impregnation. For example, when a colorless preservative is required, it is recommended that the zinc salts be used, whereas in the event that the effect of the preservative upon the wood, insofar as discoloration is concerned is of no moment, any one or all combinations of the above recommended salts may be used.

While I have, for the sake of clearness and in order to disclose my invention so that the same can be readily understood, described specific ingredients and combinations thereof, I desire to have it understood that this invention is not necessarily limited to the specific ingredients and combinations set forth, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. The improvement in an impregnating material for the preservation of wood employing an ammoniacal solution of copper and zinc salts which comprises providing in the solution a water insoluble hydroxide of said salts to reprecipitate the hydrolyzable products of the impregnating salts in the event of leaching.

2. The improvement in an impregnating material for the preservation of wood employing an ammoniacal zinc borate solution which comprises providing an excess of zinc hydroxide to reprecipitate the hydrolyzable products of the zinc borate in the event of leaching.

3. The improvement in an impregnating material for the preservation of wood employing an ammoniacal copper borate solution which comprises providing an excess of copper hydroxide to reprecipitate the hydrolyzable products of the copper borate in the event of leaching.

4. The improvement in an impregnating material for the preservation of wood employing an ammoniacal zinc salt solution which comprises providing an excess of zinc hydroxide to reprecipitate the hydrolyzable products of the zinc salts in the event of leaching.

5. The improvement in an impregnating material for the preservation of wood employing an ammoniacal copper salt solution which comprises providing an excess of copper hydroxide to reprecipitate the hydrolyzable products of the copper salts in the event of leaching.

6. A composition of the character described for the preservation of wood, consisting of 10% $CuCO_3$—$Cu(OH)_2$; 10% $ZnCO_3$—$Zn(OH)_2$; 30% $CuNH_4PO_4$; 30% $ZnNH_4PO_4$; 10% $ZnB_4O_7$; 10% $CuB_4O_7$; dissolved in aqueous ammonia.

AARON GORDON.